United States Patent [19]

Maillot

[11] Patent Number: 5,079,719
[45] Date of Patent: Jan. 7, 1992

[54] METHOD AND APPARATUS FOR CLIPPING POLYGONS

[75] Inventor: Patrick-Gilles Maillot, Sunnyvale, Calif.

[73] Assignee: Sun Microsystems, Inc., Mountain View, Calif.

[21] Appl. No.: 364,697

[22] Filed: Jun. 9, 1989

[51] Int. Cl.$^5$ ............................................. G06F 15/72
[52] U.S. Cl. .................................................... 395/134
[58] Field of Search ...................... 364/518, 521, 522; 340/723

[56] References Cited

U.S. PATENT DOCUMENTS

| | | | |
|---|---|---|---|
| 3,638,736 | 2/1972 | Sutherland | 235/152 |
| 3,816,726 | 6/1974 | Sutherland et al. | 235/152 |
| 4,181,953 | 1/1980 | Osofsky | 364/522 |
| 4,958,305 | 9/1990 | Plazza | 364/522 |

FOREIGN PATENT DOCUMENTS 0132573 2/1985 European Pat. Off. .
0167797 1/1986 European Pat. Off. .

OTHER PUBLICATIONS

Fundamentals of Interactive Computer Graphics Foley, Van Dam, p. 144, section 4.2.1.

Primary Examiner—Gary V. Harkcom
Assistant Examiner—Mark K. Zimmerman
Attorney, Agent, or Firm—Blakely, Sokoloff, Taylor & Zafman

[57] ABSTRACT

A standard polygon clipping algorithm is used to either trivially accept/reject the sides or clip the sides of a polygon. Then, for each side that cannot be trivially accepted/rejected nor clipped using the standard polygon clipping algorithm, at least one turning point is generated to replace the side by performing a Boolean operation using the region codings provided by the standard polygon clipping algorithm. As a result, the replacement turning points are generated using integer arithmetic.

10 Claims, 6 Drawing Sheets

METHOD AND APPARATUS FOR CLIPPING POLYGONS

BACKGROUND OF THE INVENTION

1. Field of the Invention

This invention relates to computer graphics systems and, more particularly, to arrangements for more efficiently clipping polygons to lie within windows on computer output displays.

2. History of the Prior Art

Modern computer systems are able to process a plurality of programs at the same time. This is usually accomplished by the various programs running on a computer system essentially timesharing the facilities of central processing unit. When a plurality of programs are being run by a central processing unit at the same time, graphic output displays for each of the programs may be presented together on the computer output display in separate windows. A window in a two-dimensional computer output display is usually a rectangle which contains the graphic information for the particular program being displayed in that window. In any case, the information being displayed in a window is often less than the entire graphic presentation which is available; and it is necessary to clip the graphics image to fit within a particular output display.

Graphics figures are often described on an output display in the form of polygons. Usually the method of clipping a polygon to fit within a window requires that the lines joining the vertices of the polygon to be displayed be compared with the lines describing the window boundaries to determine which portions of the polygon lie within the window boundaries. A number of algorithms have been provided for accomplishing this comparison of lines joining the vertices of polygons with the computer boundaries. The most used of these algorithms, the Sutherland-Hodgman algorithm is described in a paper entitled "Re-entrant Polygon Clipping", Sutherland and Hodgman, Communications of the Association for Computing Machinery, Volume 17, No. 1, January, 1974. The Sutherland-Hodgman algorithm computes, for each window boundary a new polygon by clipping each of the sides of the "input" polygon against a particular window boundary. This produces an "output" polygon. This "output" polygon then becomes the "input" polygon for the next window boundary, producing a new "output" polygon. This sequence is repeated until all the window boundaries are scanned and the last "output" polygon will fit in the window. The implementation of the Sutherland-Hodgman algorithm requires a very substantial amount of memory and requires a significant amount of central processing unit time in order to accomplish its objects.

Since so much time and memory is required by the Sutherland-Hodgman algorithm, other algorithms have been suggested. Weiler and Atherton, in an article entitled "Hidden Surface Removal Using Polygon Area Sorting", published in the proceedings of Siggraph, 1977, pages 214–222, present an algorithm for polygon hidden surface and hidden line removal. The algorithm recursively subdivides the image into polygon-shaped windows until the depth order within the window is found. The algorithm is especially accurate but is so complex that it takes a great deal of computer time and memory to operate. Furthermore, the algorithm is not optimized for a rectangular window and, consequently, is relatively slow running.

Liang and Barsky, in an article entitled "An Analysis and Algorithm for Polygon Clipping", Communications of the ACM, November, 1983, Volume 26, pages 868–877, published an algorithm which speeds the operation of the Sutherland-Hodgman algorithm by approximately two times. Unlike the Sutherland-Hodgman algorithm and Liang and Barsky algorithm is limited to two dimensional and rectangular windows. The Liang and Barsky algorithm computes the intersections of a line which is a side of a polygon extended infinitely with all clip planes also extended infinitely. It then uses these intersections to determine points lying off the polygonal sides but necessary to be included within the clipped polygon (known as turning points or turning vertices). These points are the four corners of the clipped window which in the clipped polygon often becomes portions of the polygon to be presented. The Liang and Barsky algorithm, although faster than the Sutherland-Hodgman algorithm, requires the use of a substantial number of floating point computations which are difficult and very time consuming unless the particular computer system includes a floating point co-processor. Many microprocessor based computer systems do not include such a co-processor and the calculations with these machines are extremely complicated and time consuming.

Finally, Sutherland-Cohen devised a method for clipping lines only by quickly determining cases in which a particular line segment lies entirely within the clipping window and should be completely drawn and those in which a particular line segment lies entirely outside of the clipping window within a particular area in which it should not be drawn; see Newman and Sproull, Principles of Interactive Computer Graphics 2d. Ed., Mc Graw-Hill, pp. 65–69. These are referred to as trivial acceptance and trivial rejection cases and do not require the implementation f an entire intersection calculation. The Sutherland-Cohen algorithm provides a rapid method for determining these trivial acceptance and rejection cases and greatly speeds the implementation of a clipping algorithm. However, the Sutherland-Cohen algorithm does not provide a way of clipping polygons and, therefore, does not generate the additional intersections to determine points lying off the polygonal sides but to be included within the clipped polygon (turning points).

SUMMARY OF THE INVENTION

It is therefore an object of the present invention to accelerate the presentation of graphic objects on computer output displays.

It is another object of the present invention to increase the speed at which the vertices of a polygon may be determined and clipped to fit within a window on a computer output display.

These and other objects of the present invention are realized in a method in which the Sutherland-Cohen line clipping algorithm is first applied to a polygon to be clipped to determine trivial acceptance and rejection cases, then the information determined in the Sutherland-Cohen trivial acceptance and rejection tests is utilized to determine from the regions in which the vertices of polygonal side lie the existence of additional points to be included in the polygon which do not lie on the sides of the polygon but are corners of the clipping window. This is accomplished very simply without the need to compute intersections with the window boundaries external to the visible window in most cases through the use of Boolean operations using the vertices of the end-points and various look-up tables generated for the particular window.

These and other objects and features of the invention will be better understood upon a consideration of the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance at their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

Figure 1:
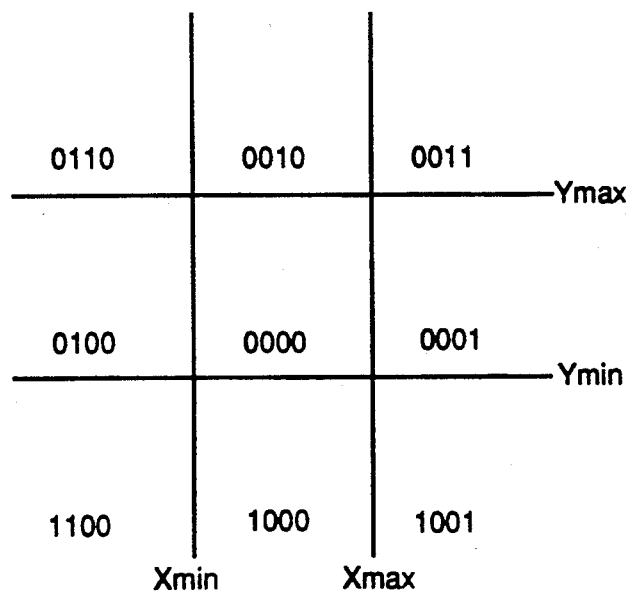
FIG. 1 is a diagram illustrating the region codes used in the Sutherland-Cohen algorithm.

Referring now to FIG. 1, there is shown a diagram illustrating the implementation of the present invention. This diagram illustrates the designations for the areas surrounding a visible window to be presented on an output display in the format provided by the Sutherland-Cohen algorithm. Four lines which designate a two dimensional clipping window are illustrated in FIG. 1, two parallel vertical lines designated Xmin and Xmax and two parallel horizontal lines designated Ymin and Ymax. The area lying in the central portion bounded by the four lines is the area of the window to be displayed on the computer output display. The other areas are those lying above, below, to the left, and to the right of the computer display window.

The Sutherland-Cohen algorithm codes each of these areas using four binary bits. A one in the leftmost bit indicates that a point lies below the clipping window, a one in the second bit from the left indicates that the point lies to the left of the window, a one in the third bit from the left indicates that the point lies above the window, and a one in the rightmost bit indicates that the point lies to the right of the window. Consequently, the window itself is designated as 0000 and the other regions are designated as shown in FIG. 1. Thus, the area above and to the left of the window is designated 0110, for example.

The Sutherland-Cohen clipping algorithm is designed to identify efficiently lines which can be trivially accepted or rejected by checking whether both vertices lie in a single particular one of these regions. For example, referring to FIG. 3, there is shown a number of different individual lines which may be considered in explaining the operation of the Sutherland-Cohen algorithm. The line designated 10 which lies completely within the window area has each of its end-points lying within the 0000 region. A check by the Sutherland-Cohen algorithm which compares the areas in which each the two vertices of a line segment lie determines that this is a trivial case of a line which should be accepted without conducting any intersection determinations or any other checks.

In like manner, the line 12 has both end-points lying within the region 0010 immediately above the window, and it may be trivially rejected after comparing the area in which its vertices lie as requiring no intersection points to be computed by the algorithm. In like manner, the line 14 may be trivially rejected as having both end-points lying within the region 0011 above and to the right of the window.

Figure 3:
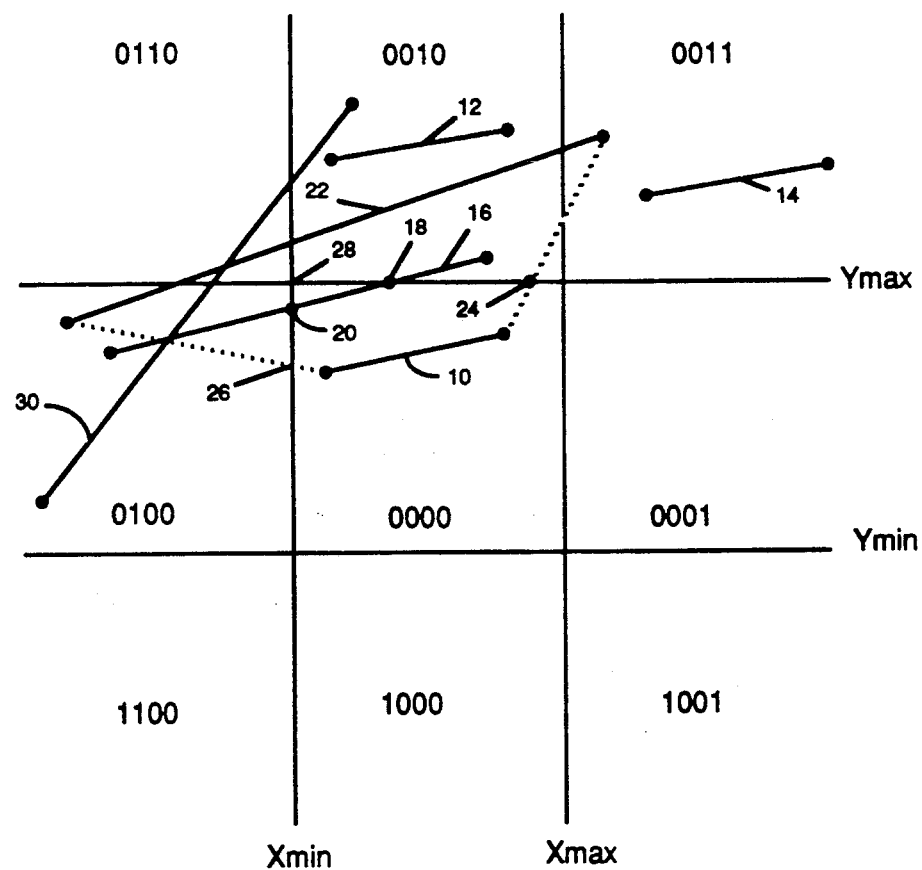
FIG. 3 illustrates various generic configurations for lines with respect to a clipping window which may be used in explaining the present invention.
Figure 2:
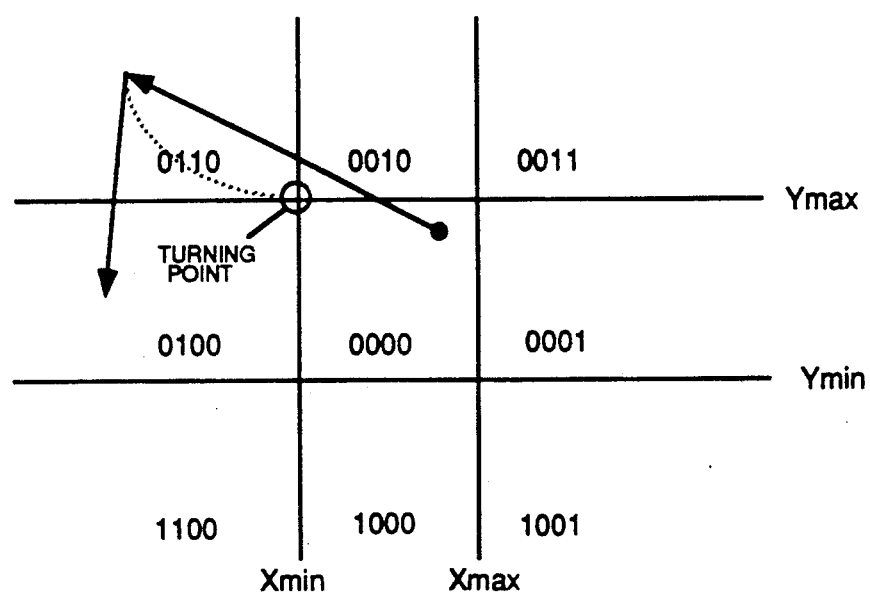
FIG. 2 is a diagram illustrating the meaning of turning point as utilized in the present invention.

However, none of the other lines illustrates in FIG. 3 may be either trivially or rejected and require the use of the Sutherland-Cohen algorithm for the determination of various intersection points in order to completely define a clipped polygon. The manner in which this is accomplished using the Sutherland-Cohen algorithm is as follows. A line such as line 16 has a first intersection with one of the extended lines defining the window boundaries determined. For example, using the algebraic definitions of the lines Ymax and the line 16, the intersection point 18 in FIG. 3 may be computed. Then, one portion of the line 16 is discarded. The Sutherland-Cohen algorithm picks the portion to be discarded by selecting a portion which lies above, below, to the right, or to the left of the window in a particular order which is followed throughout the application of the algorithm. In the case of the line 16, that portion lying above the window is discarded; and the remainder of the line 16 is checked to determine whether it may be trivially accepted or rejected. In neither applies, a new intersection of the line 16 and the next window boundary Xmin is determined at point 20. Once the intersection 20 is determined, the portion of the line to the left of the window is discarded; and the remainder of the line between the points 18 and 20 is tested to see if it may be trivially accepted or rejected. This portion, obviously, may be trivially accepted since both end points lie within the boundaries of the visible window in the region 0000; and the computations for clipping that particular line 16 are complete.

When applied to other lines, such as the line 22, the determination accomplished by the algorithm becomes more complex. For example, the line 22 may complete a polygon which lies partially within the window. In such a case (for example, in the case of the polygon joining the end-points of the lines 22 and 10 shown by the dotted lines in FIG. 3), the intersection of those lines with the edges of the clip window at points 24 and 26 may be determined in a straight forward manner as explained above. However, the polygon is only completed by including within the clip window a portion of the polygon which extends to the upper left hand corner of the clip window. This point 28 does not lie on any of the lines defining the polygon and must be determined from the position of the line 22 with respect to the window boundaries. There is no way to find this point using the Sutherland-Cohen algorithm since it is a line clipping algorithm. The Sutherland-Cohen algorithm proceeds to compute the various intersections of the line 22 extended with the Ymax and Xmin lines defining the clip window extended and reaches a conclusion which rejects the entire line.

The Lian-Barsky algorithm to some extent overcomes this problem by utilizing a scheme of determining all the intersections and assigning clip point values from the determination of those intersections. Although the Liang-Barsky algorithm is twice as fast as the basic Sutherland-Hodgman algorithm, it has to compute intersections for all of the clip window boundaries before it can accomplish the assignment of the turning points; and it requires the computation of the intersections by means of floating point calculations. In many microprocessor-based computer systems, such computations are extremely slow and therefore detract from the presentation of the image on the graphical output display.

The present invention offers a substantial improvement in determining the points lying off the sides of a polygon, the so-called turning points, without the necessity of computing intersections with the infinitely extended window boundaries in most cases. The present invention operates as follows. First, the method recognizes that the region codes assigned by the Sutherland-Cohen algorithm each contain two one bits if they lie at the diagonal corners of the visible window and a single one bit if they lie to the right, left, above, or below the visible window. The method uses this recognition to determine the turning points of a visible polygon.

The Sutherland-Cohen algorithm is first applied to determine whether a trivial accept or reject condition exists of the first line segment defining a side of a polygon to be clipped. If such a condition does not exist, then the Sutherland-Cohen algorithm determines the intersections of the sides with the edges of the visible window. If these do not occur, the information provided by the Sutherland-Cohen algorithm about the regions in which the vertices lie is sorted into categories based on the beginning and ending points of the line segment. Each side is considered from a beginning point to an ending point at which the next side is considered. If the end-point of the line lies in a region in which the four bit code designation includes two one bits (i.e., an area at a corner of the window), then the corner of the window of the visible window touching that region is assigned to the visible polygon as an additional point in the polygon to be clipped, i.e., a turning point. As may be seen in FIG. 1 this means that if an end-point of a side of polygon lies within the regions numbered 0110, 0011, 1001, or 1100 at the diagonal corners of the visible window, then this first (so-called general rule) will apply; and the window corners closest to each of these regions are assigned as additional points for the clipped polygon.

This general rule does not cover the cases where the end-points lie within the regions immediately above, below, and to the left and right of the window. It also does not cover all turning points for lines which end in the diagonal regions. For this reason, line segments are catagorized depending on the regions in which their beginning and end-points lie. If both points lie in regions above, below, and to the left and right of the window where the codes for the regions have a single one bit, the sides are designated as 1-1 bit lines and treated in one manner. On the other hand, if the beginning and ending points lie coded regions one of which has a single one bit and the other of which has a pair of one bits (a so-called 1-2 bit line), the line is treated in a different manner. Finally, lines which are beginning and ending points both of which lie in regions the codes for which includes a pair of one bits (so-called 2-2 bit lines) are treated in a third manner.

It will be seen that in the case of a 1-1 bit line, if both vertices lie within the same region, then no turning point needs to be assigned; for this line will already have been trivially rejected in the first step of the Sutherland-Cohen algorithm as a trivial rejection case. However, if both vertices of a 1-1 bit side lie within different regions, then the two codes are combined in a logical OR operation; and the results of that calculation are used in applying the general rule. For example, if a line starts in region 0100 and ends in 0010, such as the line 30 shown in FIG. 3, then a logical OR calculation will provide the binary number 0110 which is the number as the code for the upper left hand region. This number, using the general rule, requires the assignment of the upper left hand corner of the visible window as a turning point to be included within the polygon to be described within the clipped window.

In the case of lines with vertices falling within the 1-2 bit designation, four possibilities occur. First, if the end-point of the line lies in a 1 bit region and the logical AND of the two codes of the regions is not zero, then no turning point is generated. For example, a line which proceeds from the 0110 area to the 0010 area, needs to have no turning point generated because the upper left hand corner will have already been designated as a turning point by a line ending at the vertex in the 0110 region under the general rule; and once a point has been designated as within a clipped polygon, it need not be so designated again in order to describe completely the polygon which lies within the clipped window.

Figure 4:
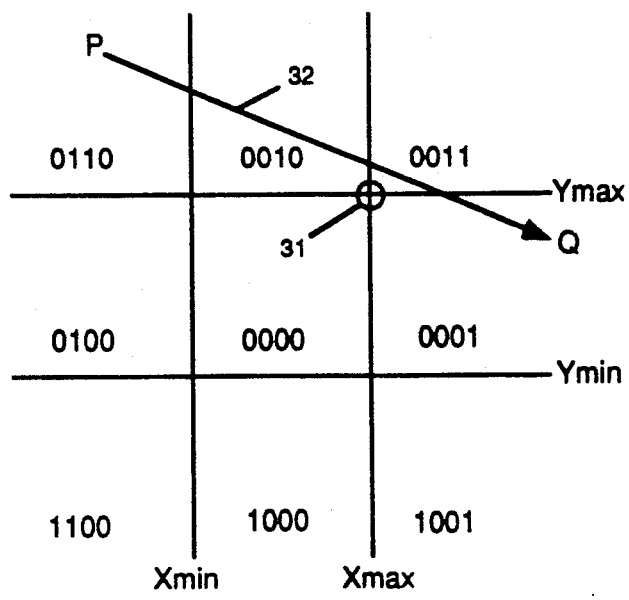
FIG. 4 illustrates a particular turning point which is to be generated for a particular side of a polygon with respect to a particular clipped window in carrying out this invention.

However, in the case in which the end-point of the line lies in a 1 bit region and the ANDing of the codes designating the regions of the vertices provides a zero result, such as a line 32 running from the region 0110 to the region 0001 illustrated in FIG. 4, a turning point 31 is generated that corresponds to the upper right hand corner of the window. In the present invention this designation is accomplished by a look-up table.

If the line ends in a 2 bit region and the ANDing of the two codes does not result in zero, then the case is handled by the general rule and produces as a turning point the window corner closest to the end-point of the line.

Figure 5:
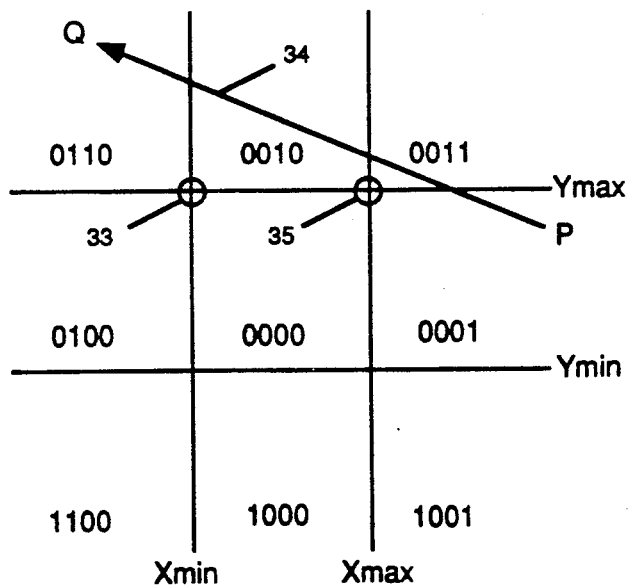
FIG. 5 illustrates another set of turning points which are generated with respect to a particular side of a polygon in a particular clipping window in carrying out the invention.

If, on the other hand, the line ends in a 2 bit region and the ANDing of the two codes results in a zero, such as a line 34 beginning in the area 0001 and ending in the area 0110 as shown in FIG. 5, then two turning points must be generated, one point 33 by the general rule at the upper left hand corner of the window and one point 35 at the upper right hand corner of the window. This second turning point 35 is also handled by a look-up table in the present implementation of the invention.

In the case of sides designated as 2-2 bit cases, three situations occur. First, where both the beginning and ending points lie in the same region, no turning point needs to be generated since this will have been handled as trivial acceptance or rejection case by the Sutherland-Cohen algorithm. If not a trivial case and the ANDing of the two code regions for the end-points of the line does not produce a zero, the general rule is applied for the end-point of the side. Such sides might be lines running, for example, from region 0011 to region 1001 and from region 1001 to region 1100.

Figure 6:
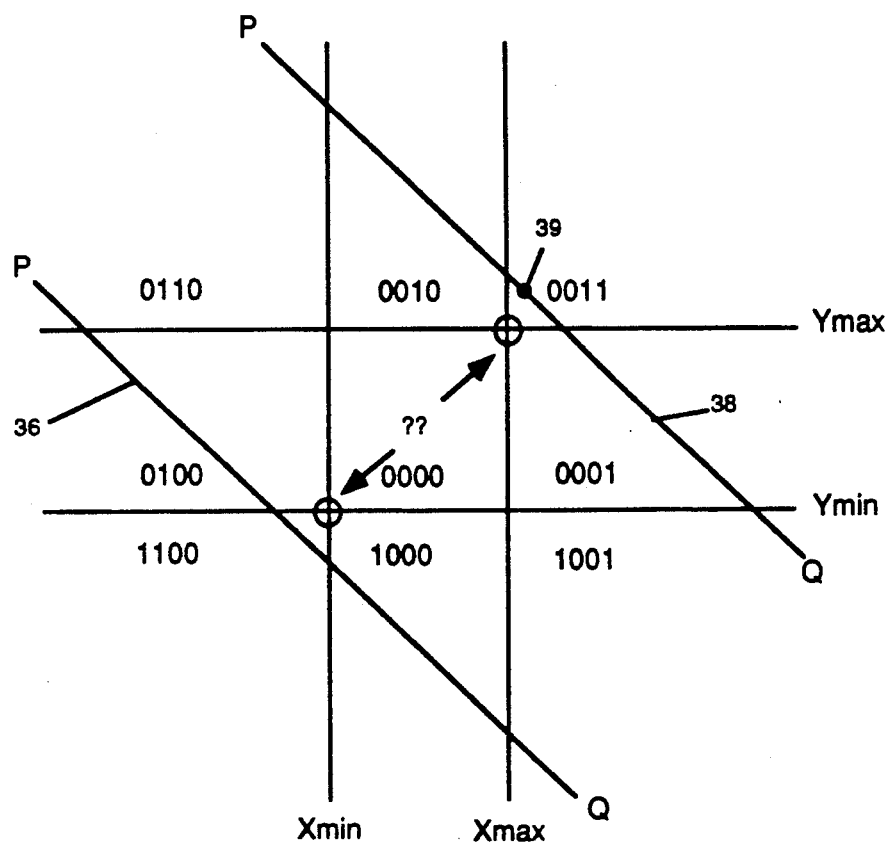
FIG. 6 illustrates an ambiguous condition which must be handled in carrying out the invention.

If, however, the ANDing of the codes for the two regions in which the ends of the lines lie produces a zero (for example, the lines 36 and 38 in FIG. 6 running from region 0011 to an opposite diagonal region 1100), then the line may lie to one or the other side of the visible window; and ambiguous situation is produced. In this situation, the line (36 or 38 in FIG. 6) is divided into two lines, by determining a so called mid-point (39 in FIG. 6 for example on line 38). The present implementation of the invention then determines if this point lies in the same region as one of the two original points. If this is the case, the corresponding original point is replaced by the mid point and a new mid point is evaluated. This operation is repeated until the midpoint lies in a region different from the end points. If or when the mid point is not in one of the regions of the end points, the present implementation of the invention determines the adequate turning point by applying one of the rules previously described for the 1-1 bit or 1-2 bits case.

In implementing the look-up tables in accordance with the present invention, it has been determined that such a table is easily implemented in a relatively simple manipulation. For example, to determine the turning point labelled 31 in FIG. 4, the code of the area 0110 at which the line segment 32 begins is simply added in a non-Boolean arithmetic computation to the content of a look-up table indexed by the code 0001 (which defines the end point) to provide a code number 0110. Thus, it will be seen by comparison with the regions of FIG. 4 that the turning point at the upper right hand corner of the window will be indicated by the general rule if minus three is added to the code 0110 at the beginning vertex (the binary representation of 6). Consequently a binary stated minus three is provided in the look-up table, at the indexed position 0001, and the general rule is then applied. In like manner the look-up table may hold a number plus or minus six or plus three in order to realize the turning points for the other corners or lines which variously start or end in a bit region and start or end in a 2 bit region.

A line segment beginning in code region 1100 and ending in the same region 0001 in like manner uses a minus three from the look-up table to reach a turning point in code region 1001. A line segment beginning in regions 1100 or 1001 and ending in code region 0010 is indexed to and a minus six to reach turning points in regions 0110 on 0011, respectively. A line segment beginning in either code region 0011 or 0110 and ending in code region 1000 is indexed to and adds a plus six to reach turning points in regions 1100 or 1001, respectively. And a line segment beginning in code regions 0011 or 1001 and ending in region 0100 is indexed to and adds a plus three to reach turning points in regions 0110 or 1100, respectively.

In devising the look-up tables for the invention disclosed herein, a first look-up table is provided for each of the 2 bit codes generated by either an end-point which has a vertex ending in a 2 bit region or for a Boolean OR operation which provides a code designating such a region. The look-up table produces an X value and a Y value for each of these turning points (corners of the window) which are then added to the clipped polygon to completely define the polygon.

Figure 7:
FIG. 7 illustrates Look-up Tables used in the present invention.
Figure 7:

The first look-up table 41 is shown in FIG. 7. The outer four corner regions, (0110), (0011), (1100), (1001), correlate to an X and Y value on the display screen which represent the outer four corners of the visible window. The exact coordinates of the X and Y value for each corner of the visible window will be dependent upon where the visible region is defined on the screen and the resolution of the particular display screen.

The second look-up table provided in implementing this invention is one in which the code for the ending vertex is provided as an offset to the address and a value to be added or subtracted from the other code for the beginning vertex to reach the value for the particular corner of the window is provided by the table. The second look-up table 43 is shown in FIG. 7. It can be seen that each indexed value, which are the four 1 bit regions, produces either a plus or minus 3, or a plus or minus 6. This value is either subtracted or added (depending on the sign of the number) to one of the codes, depending on the different cases, and the first look-up table is consulted under the address of the result to provide a turning point. Again, this turning point is provided as an X value and a Y value to indicate an additional point to be added to the clipped polygon.

Figure 8:
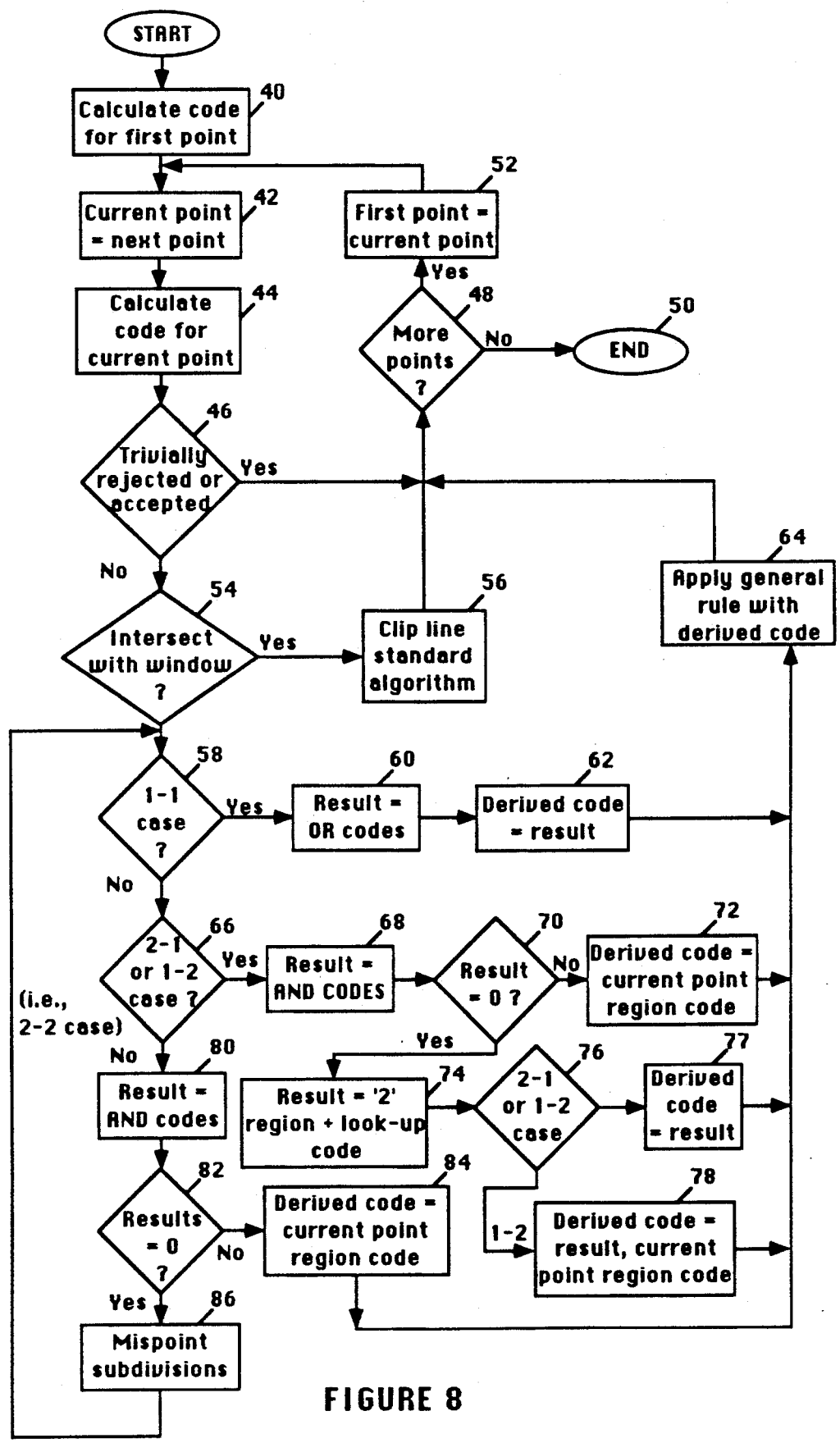
FIG. 8 is a flow chart illustrating the method of the present invention.

A general algorithm for accomplishing the invention is as follows:

Calculate the code of the first point of the polygon. for all subsequent points:
  Calculate the code of the point,
  Clip the line according to the two codes,
  if the line is outside the clipping region:
    Test for 1-1, 1-2 and 2-2 cases.
  endif
  Test for the general case.
  Set "first point"="current point".
endfor A more detailed flowchart for accomplishing the invention is shown in FIG. 8. Initially, the code is calculated for a first point of the polygon 40. The code is also calculated for a current point which is set to be the next subsequent point of the polygon 42, 44. Then the line with the first point and the current point as the beginning and end points is tested to determine if it can be trivially accepted or rejected 46 as previously described. If the line is trivially accepted or rejected, the process is repeated with the first point set to the current point if there are more subsequent points 48, 52 or terminated if all points are analyzed 48, 50. If the line is not trivially accepted or rejected, the line is tested to determine if it intersects with the display window 54.

If the line intersects with the display window, the line is clipped 56 as previously described. Then, the process is either repeated or terminated 48, 50, 52. If the line does not intersect with the window, the line is tested to determine if it is a 1-1 case, 1-2/2-1 case or 2-2 case 58, 64.

If the line is a 1-1 case 58, the Boolean OR operation is performed against the codes 60 and the general rule is applied 64 using the result of the Boolean operation 62 as previously described. After applying the general rule 64, the process is repeated or terminated, 48, 50, 52.

If the line is a 1-2/2-1 case 66, the Boolean AND operation is performed against the codes 68. If the result of the Boolean operation is non-zero 70, the general rule is applied 64 using the region of the current point 72 as previously described. If the result of the Boolean operation is zero 70 and the line is 2-1 case 76, the general rule is applied 64 using the result of the Boolean operation after adding an arithmetic increment looked up from a table 74, 77 as previously described. If the result of the Boolean operation is zero 70 and the line is a 1-2 case 76, the general rule is applied 64 using the result of the Boolean operation after adding an arithmetic increment looked up from a table 74, 78 as previously described. Additionally, the general rule is also applied 64 using the region of the current point 78 as previously described.

If the line is a 2-2 case 66, the Boolean AND operation is performed against the codes 72 and the general rule is applied 64 using the region of the current point 84 if the result is non-zero 82 as previously described. If the result is zero 82, the line is re-processes as a 1-1 case, or 1-2/2-1 case after the ambiguity is resolved through a mid-point subdivision process 86 as previously described.

A specific implementation of this algorithm in the C language is provided in the following paragraphs. Not included in this implementation is the Sutherland-Cohen algorithm which is composed of the following two functions:

Cp_move_clip() performs a simple coding of the first point of the polygon. This function returns SEGM if the point is inside the clipping region, NOSEGM if the point is outside.

Cp_draw_clip() performs the clipping of a line coded in the two structures Cp_move and Cp_draw which respectively represent the start and end point of one polygon edge. Cp_draw_clip provides the following information:

The returned status, NOSEGM, SEGM, SEGM |CLIP, which represents the visibility characteristic of the edge, M_move and M_draw, which are the computed codes of the start and end point of the edge, respectively.

Cp_move and Cp_draw contain the clipped line coordinates at the end of the algorithm.

```
typedef struct {
    float x;              /* x coordinate (could be int).*/
    float y;              /* y coordinate (could be int) */
} Upoint;                 /* User point */
typedef struct {
    Upoint Point;         /* The point's coordinates */
    int    code;          /* The code computed for this point */
} Ppoint;                 /* Internal representation */
#define  MAXTEST      1
#define               0   /* The line is rejected */
NOSEGM
#define SEGM         1    /* The line is visible (even
                             partially) */
#define CLIP         2    /* The line has been "clipped"
                             (left) */
#define             0x100 /* A flag to indicate a two bits
TWOBITS                     code */
Ppoint    Cp_move;        /* The start point of the line */
int       M_code;
Ppoint    Cp_draw;        /* The end point of the line */
int       D_code;
Ppoint    C_exchange;
                          /* These are two look_up tables */
                          /* used in finding the turning point */
                          /* in the case 1-2. They should be */
                          /* modified with the regions' codes.*/
int  Tcc[16] = {0,-3,-6,1,3,0,1,0,6,1,0,0,1,0,0,0};
int  Vpt[16] = {-1,-1,-1,2,-1,-1,3,-1,-1,1,-1,-1,0,
       -1,-1,-1};
                          /* Tcc is used to compute a correct */
                          /* offset, while Vpt gives an index */
                          /* in the Viewport array, for the */
                          /* turning coordinates */
Upoint   Viewport[4];     /*Viewport coordinates ll,lr,ur,ul */
```

The function CP_space_code() returns the code associated with a given point. The returned code can be a single value, or an union between a single value and a flag that indicates a two bits code.

```
CP_space_code(point_to_code)
Upoint          *point_to_code;
{
    if (point_to_code->x < Lower_left.x) {
        if (point_to_code->y < Upper_right.y)
            return (6 | TWOBITS);
        if (point_to_code->y < Lower_left.y)
            return (12 | TWOBITS);
        return (4);
    }
    if (point_to_code->x > Upper_right.x) {
        if (point_to_code->y < Upper_right.y)
            return (3 | TWOBITS);
        if (point_to_code->y < Lower_left.y)
            return (9 | TWOBITS);
        return (1);
    }
    if (point_to_code->y < Upper_right.y) return (2);
```

```
        if (point_to_code->y < Lower_left.y) return (8);
            return (0);
    }
```

The CP_2D_polygon_clip() function accepts an array of vertices as input and clips the vectors against a rectangular viewpoint. Turning points are generated when necessary to keep the polygon structure and ensure a correct visualization. The function generates the resulting polygons in an output array of points.

```
CP_2D_polygon_clip(nin,in,nout,out)
int         nin;
Upoint      *in;
int         *nout;
Upoint      *out;
{
register int    i, j, k;
register Ppoint *pt_Cp_move   =&Cp_move;
register Ppoint *pt_Cp_draw   =&Cp_draw;
/*
 * Temporary data used in the case of 2-2 bits.
 */
Upoint      Cp_t_move;
Upoint      Cp_t_draw;
Upoint      Cp_A_point;
int         A_code;
/*
 * Be sure to close the polygon.
 */
    k = nin + 1;
    in[nin] = in[0];
/*
 * Compute the first point' status.
 * If visible, then store the first point in the output array.
 */
    if (CP_move_clip(in)) {
        out[*nout] = pt_Cp_move->Point;
        *nout += 1;
    }
/*
 * Next polygon's points ... We build a vector from the "move"
 * point to the "draw" point.
 * Clip the line with a standard 2D line clipping method.
 */
    for (i = 1; i < k; i++) {
        j = CP_draw_clip(in + i);
/*
 * If the line is visible, then store the computed point(s), and
 * jump to the general case.
 */
        Cp_move.Code = D_code;
        if(j & SEGM) {
            if (j & CLIP) {
                out[*nout] = pt_Cp_move->Point;
                *nout += 1;
            }
            out[*nout] = pt_Cp_draw->Point;
            *nout += 1;
/*
 * Here the line has been rejected ... See what we can do!
 */
        } else {
/*
 * Begin with a 2 bits end point.
 */
            if (D_code & TWOBITS) {
                if (! (M_code & D_code)) {
/*
 * If the start point is also a 2 bits ... Need some more to
 * make a decision!
 */
                    if (M_code & TWOBITS) {
                        j = 1;
                        Cp_t_move = pt_Cp_move->Point;
                        Cp_t_draw = pt_Cp_draw->Point;
                        while (j) {
                            Cp_A_point.x = (Cp_t_move.x + Cp_t_draw.x)
                                / 2.;
                            Cp_A_point.y = (Cp_t_move.y + Cp_t_draw.y)
                                / 2.;
                            A_code = Cp_space_code(&Cp_A_point);
                            if (A_code & TWOBITS) {
                                if (A_code == D_code) Cp_t_draw =
                                    Cp_A_point;
                                else if (A_code == M_code) Cp_t_move =
                                    Cp_A_point;
                                else j = 0;
                            } else {
                                if (A_code & D_code) A_code = D_code +
                                                    Tcc[M_code &
                                    Oxf];
                                else                 A_code = M_code +
                                                    Tcc[D_code &
                                    Oxf];
                                j = 0;
                            }
                        }
                    } else {
/*
 * This is for a 1 bit start point (2 bits end point).
 */
                        A_code = D_code + Tcc[M_code];
                    }
                    out[*nout] = Viewport[Vpt[A_code & Oxf]];
                    *nout += 1;
                }
            } else {
/*
 * Here we have a 1 bit end point.
 */
                if (M_code & TWOBITS) {
                    if (! (M_code & D_code)) D_code = M_code +
                        Tcc[D_code];
                } else {
                    D_code |= M_code;
                    if (Tcc[D_code] == 1) D_code |= TWOBITS;
                }
            }
/*
 * The general rule ...
 */
            if (D_code & TWOBITS) {
                out[*nout] = Viewport[Vpt[D_code & Oxf]];
                *nout += 1;
            }
        }
/*
 * Copy the current point as the next starting point.
 */
        pt_Cp_move->Point = *(in + i);
    }
    if (*nout) {
        out[*nout] = out[0];
        *nout += 1;
    }
}
```

The implementation of the clipping algorithm illustrated above has been programmed for a number of different workstations and compared in speed to the implementations of the Sutherland and Hodgman algorithm and the Liang and Barsky algorithm for a number of different figures. In all cases, the algorithm runs substantially faster than do the Sutherland-Hodgman and the Liang and Barsky algorithms when comparing similar polygonal figures. The algorithm of this invention is able to accomplish the operation using both floating point operations and integer operations. When using integer operations, the proposed invention operates substantially faster than do either of the other two algorithms.

Although the invention has been disclosed in specific arrangements in order to illustrate its operation, various additional implementations of the invention will appear to those skilled in the art without departing from the scope and spirit of the invention. The invention should therefore be considered to be that defined by the scope of the claims which follow.

I claim:

1. A method for clipping a polygon for display on a computer output display, said polygon comprising a beginning and ending vertices connected by a substantially straight line forming a side of said polygon, said side being clipped for display in a substantially rectangular display window on said computer output display having four corners, said method comprising the steps of:

assigning beginning and ending codes to the beginning and ending vertices, each of the codes indicating whether each of the vertices lies in a region that is above, below, to the right of, to the left of, above and to the right of, above and to the left of, below and to the right of, below and to the left of, or inside said display window, each of the codes comprising at least four bits, a first bit indicating whether the vertex is located in one of the three regions below said display window, a second bit indicating whether the vertex is located in one of the three regions left to said display window, a third bit indicating whether the vertex is located in one of the three regions above said display window, and a fourth bit indicating whether the vertex is located in one of the three regions right of said display window;

including said side for display if both of said vertices lie in the same region inside said display window;

excluding said side from display if both of said vertices lie in the same region outside said display window;

including a portion of said side for display if said vertices lie in different regions and said side intersects with one or two edges of said display window, said portion being determined by clipping one or both ends of said side which lie outside the display window;

replacing said side with a first corner whenever said vertices lie in different regions and said side does not intersect with any edge of said display window, said first corner being the corner of said display window closest to a first derived region, said first derived region being derived based on a Boolean result determined by performing a selected one of a Boolean OR and a Boolean AND operation on the assigned codes of the beginning and ending vertices; and replacing said side with an additional second corner whenever said vertices lie in different regions and said side does not intersect with any edge of said display window, and said vertices further meet the condition that said beginning vertex lies in one of the four regions that are above, below, to the right of, and to the left of said display window and said ending vertex lie in one of the four regions that are below and to the left, above and to the right, above and to the left, and below and to the right of said display window, said second corner being the corner of said display window closest to a second derived region, said second derived region being derived based on a Boolean result determined by performing a Boolean AND operation on said assigned codes of the beginning and ending vertices.

2. The method for clipping a polygon for display on a computer output display as set forth in claim 1, wherein when said different regions where said beginning and ending vertices lie comprise two of the four regions that are above, blow, to the right and to the left of said display windows, said first derived region is derived based on a Boolean result determined by performing a Boolean OR operation on the assigned codes of the beginning and ending vertices, said first derived region being equal to said Boolean result.

3. The method for clipping a polygon for display on a computer output display as set forth in claim 1, wherein said different regions where said beginning and ending vertices lie comprise a first differing region that is one of the four regions that are above, below, to the right and to the left of said display window, and a second differing region that is one of the four regions that are above and to the right, above and to the left, below and to the right and below and to the left of said display window, said first derived region is derived based on a Boolean result determined by performing a Boolean AND operation on said assigned codes of said beginning and ending vertices.

4. The method for clipping a polygon for display on a computer output display as set forth in claim 3, wherein said first derived region is derived from said Boolean result as follows:

if said Boolean result equals non-zero, setting the first derived region to be equal to the region of said ending vertex; and if said Boolean result equals zero, setting the first derived region to be equal to the sum of an arithmetic increment and the code for said second differing region, said arithmetic increment being looked up from a table using said first differing region, said table comprising the assigned codes for said first differing region and a plurality of corresponding arithmetic increments.

5. The method for clipping a polygon for display on a computer output display as set forth in claim 4, wherein said arithmetic increments corresponding to said first differing region are $-3$, $-6$, $+3$, and $+6$.

6. The method for clipping a polygon for display on a computer output display as set forth in claim 3, wherein said second derived region is set to be equal to the region of said ending vertex when said Boolean result equals zero.

7. The method for clipping a polygon for display on a computer output display as set forth in claim 1, wherein when said different regions where said beginning and ending vertices lie are two of the four regions that are above and to the right, above and to the left, below and to the right and below and to the left or said display window, said first derived region is derived based on a Boolean result determined by performing a Boolean AND operation on said assigned codes of said beginning and ending vertices.

8. The method for clipping a polygon for display on a computer output display as set forth in claim 7, wherein said first derived region is derived from said Boolean result as follows:

if said Boolean result equals non-zero, setting said first derived region to be equal to the region of said ending vertex; and if said Boolean result equals zero, setting said first derived region to be equal to one of two opposing corner.

9. The method for clipping a polygon for display on a computer output display as set forth in claim 8, wherein said two opposing corner regions are:

the regions that are above and to the left and below and to the right if said beginning and ending vertex lie in the regions that are above and to the right and below and to the left; and the regions that are above and to the right and below and to the left if said beginning and ending vertex lie in the regions that are above and to the left and below and to the right.

10. The method for clipping a polygon for display on a computer output display as set forth in claim 8, wherein said first derived region is resolved to one of the two opposing corner regions by applying the method of the present invention to a truncated version of said side generated by a mid-point subdivision process.

* * * * *

UNITED STATES PATENT AND TRADEMARK OFFICE
CERTIFICATE OF CORRECTION

PATENT NO. : 5,079,719
DATED : January 7, 1992
INVENTOR(S) : Maillot

It is certified that error appears in the above-indentified patent and that said Letters Patent is hereby corrected as shown below:

In column 1 at line 30, please delete " of " and insert -- for --.

In column 2 at line 9, please delete " and " and insert -- the --.

In column 3 at line 42, please delete " at " and insert -- of --.

In column 7 at line 57, please delete " and " and insert -- and an --.

In column 14, claim 2 at line 3, please delete " blow " and insert -- below --.

Signed and Sealed this

Fifth Day of August, 1997

Attest:

BRUCE LEHMAN

Attesting Officer

Commissioner of Patents and Trademarks